3,549,675
PREPARATION OF STEAROYL FLUORIDE
Edward S. Rothman and Samuel Serota, Philadelphia, Pa., assignors to the United States of America as represented by the Secretary of Agriculture
No Drawing. Filed Apr. 22, 1968, Ser. No. 723,304
The portion of the term of the patent subsequent to Feb. 24, 1987, has been disclaimed
Int. Cl. C07c *51/58;* C11c *3/00*
U.S. Cl. 260—408    5 Claims

ABSTRACT OF THE DISCLOSURE

Stearoyl fluoride of high purity is prepared by passing dry hydrogen fluoride through molten isopropenyl stearate or an ethereal solution of isopropenyl stearate.

---

A non-exclusive, irrevocable, royalty-free license in the invention herein described, throughout the world for all purposes of the United States Government, with the power to grant sublicenses for such purposes is hereby granted to the Government of the United States of America.

This invention relates to the preparation of stearoyl fluoride and more specifically to a simple, direct process for preparing stearoyl fluoride by the reaction of the enol ester isopropenyl stearate and dry hydrogen fluoride.

Stearoyl fluoride is a reagent comparable to the acid chloride used commercially for the introduction of the stearoyl group into a wide variety of hydroxy and amino substrate materials. In some cases the fluoride functions more effectively in the stearoylation of substrates that are not easily attacked because of its higher activity owing to the smaller size of the fluorine atom (atomic weight 19) relative to the bulkier chlorine atom (atomic weight 35.5). Consequently, fluorine compounds are becoming increasingly important in the chemical industry.

The object of this invention is to provide a novel process for preparing stearoyl fluoride of high purity.

According to this invention dry hydrogen fluoride is reacted with isopropenyl stearate in solution or in the molten state to produce high purity stearoyl fluoride. The reaction is complete in about thirty minutes at an optimum temperature range of 90–135° C. Gaseous acetone is liberated as the sole, easily removable by-product and the residual stearoyl fluoride is pure enough to use as-is for most purposes.

Since glass and other silicaceous materials are attacked by hydrogen fluoride, polymeric fluorocarbon (Teflon) vessels are used for these preparations. Plasticized polymeric hydrocarbons (Tygon) are also attacked by hydrogen fluoride but stainless steel vessels are useable.

The product, stearoyl fluoride, surprisingly is a solid at room temperature. It has a melting point of 34° C. which is higher than that (22° C.) of the higher molecular weight chloride. The fluoride may be distilled in high vacuum without decomposition, and, except in solution, is fairly stable especially in a relatively dry atmosphere.

The object of this invention cannot be achieved by substituting the closely related homolog vinyl stearate or the isomeric normal propenyl stearates for the enol ester, isopropenyl stearate. These compounds are useless in the process of this invention.

The present invention is illustrated by the following examples.

EXAMPLE 1

A stream of dry hydrogen fluoride gas was introduced into 25 g. of molten isopropenyl stearate at 120° C. in such a manner as to bubble through the melt. After 40 minutes the acid gas stream was stopped and acetone residues were removed by entrainment in dry nitrogen gas streams. The residue was cooled and solidified as the temperature dropped below 34° C., the freezing point. The product was recrystallized from dry pentane to a nearly-white fluffy crystalline mass. The product could also be purified by distillation, boiling point 130° C. at 0.05 mm. Hg. The infrared spectrum showed a strong carbonyl peak at 1843.4 cm.$^{-1}$ and a carbon-fluorine absorption band at 1081.7 cm.$^{-1}$.

EXAMPLE 2

1.0 gm. of isopropenyl stearate was dissolved in 75 ml. of dry diethyl ether (dried over sodium metal) and dry hydrogen fluoride gas was passed through the solution for 2 hours while the temperature of the solution was maintained at 30° C. Infrared analysis of the only product stearoyl fluoride, showed a carbonyl band at 1843.4 cm.$^{-1}$ and a C–F band at 1081.7 cm.$^{-1}$. No trace of an ester band at 1735 cm.$^{-1}$ was found indicating the absence of ethyl stearate.

While we have specifically described the stearic isopropenyl ester in this disclosure, extension to other fatty isopropenyl esters of similar chain length such as the palmitate and the myristate as well as mixtures derived ultimately from naturally occurring fats such as tallow and cocoa butter will be obvious to one skilled in the art.

We claim:

1. A process for making stearoyl fluoride comprising reacting isopropenyl stearate with anhydrous hydrogen fluoride.

2. The process of claim 1 in which anhydrous hydrogen fluoride is passed through molten isopropenyl stearate for about 30–60 minutes.

3. The process of claim 2 in which the reaction is conducted at about 120° C.

4. The process of claim 1 in which anhydrous hydrogen fluoride is passed through a diethyl ether solution of isopropenyl stearate for about two hours.

5. The process of claim 4 in which the reaction is conducted at a temperature of about 30° C.

References Cited

Fedulov: "Preparation of the Acid Chloride of Organic Acids" Chem. Abs., vol. 63 (1965), 1707f.

Oda et al.: "Aliphatic Acid Chlorides," Chem. Abs., vol. 61 (1964), 2786g.

Bauer: "Preparation of Fat Acid Chlorides," Chem. Abs., vol. 40 (1946) 1330.

LEWIS GOTTS, Primary Examiner

C. L. MILLS, Assistant Examiner

U.S. Cl. X.R.

260—544